UNITED STATES PATENT OFFICE.

HARRY M. WEBER, OF EAST ORANGE, NEW JERSEY, ASSIGNOR TO ELLIS-FOSTER COMPANY, A CORPORATION OF NEW JERSEY.

PROCESS OF MAKING SULFURIC ACID OF PREDETERMINED STRENGTH.

1,233,626.  Specification of Letters Patent.  Patented July 17, 1917.

No Drawing.  Application filed January 2, 1917. Serial No. 140,109.

*To all whom it may concern:*

Be it known that I, HARRY M. WEBER, a citizen of the United States, and a resident of East Orange, in the county of Essex and State of New Jersey, have invented certain new and useful Improvements in Processes of Making Sulfuric Acid of Predetermined Strength, of which the following is a specification.

This invention relates to a method of producing sulfuric acid and is concerned particularly with the production of concentrated and fuming sulfuric acid obtained by the introduction of sulfuric anhydrid into sulfuric acid of certain strengths as will be hereinafter more fully set forth.

In the absorption of sulfuric anhydrid by sulfuric acid it has been proposed to pass the sulfuric anhydrid into 66° acid, in which case a large amount of white fumes are produced and the absorption is relatively incomplete. It has also been proposed to absorb the sulfuric anhydrid in a series of receptacles containing sulfuric acid of progressively increasing strength. Also it has been proposed to pass sulfuric anhydrid together with dilute acid into sulfuric acid of a certain strength to maintain an acid of constant strength. In such procedure a strength of 97 to 99% acid is usually employed.

According to the present invention it is the object to secure the absorption of sulfuric acid in an anhydrous sulfuric acid, that is to say, 100% sulfuric acid or fuming acid, so as to avoid as far as possible any unfavorable effect due to the presence of moisture and also enable the employment of iron vessels without danger of attack of the metal.

To this end the absorption is carried out according to the present process in an acid strength of 100% or slightly higher, preferably ranging from fuming acid of above 100 or 101% to approximately 105% or thereabout, when the object is to produce ordinary 98% acid and when fuming acid of various strengths is required, then the absorption is carried out starting with an acid of at least 100% strength and raising the concentration of the fuming acid to the desired point. (10%, 20%, 50%, etc.)

In the production of acid of say 98% strength sulfuric anhydrid is passed into acid of 100% strength or slightly higher, raising the strength to say 105%, that is to 100 parts of 100% sulfuric acid ($H_2SO_4$) is added 5 parts of $SO_3$, thus converting a portion of the sulfuric acid into pyro sulfuric acid or similar acid body. The absorption of the sulfuric anhydrid takes place readily between these limits without the unfavorable results likely to be brought about by use of dilute acid. A strength of 105% or thereabout having been obtained, a quantity of a weaker acid, as for example, ordinary 66° acid is mixed with the sulfuric acid containing 5% $SO_3$ to produce an acid of approximately 100% strength and this mixture is divided, one portion being diluted with 66° acid to produce 98% acid, while the remainder is put back into the absorbing apparatus and is again brought up to say 105% strength, when the operation of dilution to 100% is repeated and division of the product again made with further dilution of one portion to produce 98% strength as aforesaid. Thus this operation may be conducted to produce acid of 98% strength or thereabout without the necessity of passing sulfuric anhydrid into sulfuric acid containing moisture and hence a substantial avoidance of the white fumes, losses and other difficulties brought about by the use of weak acid is greatly minimized.

As stated, when it is desired to produce fuming acid, such as 20% fuming acid, the sulfuric anhydrid is passed into acid of at least 100% strength and the strength brought up gradually to the required degree. In this operation as well as in the other absorbing operations aforesaid, it is desirable to use agitation to render the weak acid more effective and at the same time to cool the liquid acid to a point where absorption progresses favorably, say between 60 and 80° F. The lower the temperature the better the absorption and the temperature therefore should be preferably lowered to the point at which absorption takes place with greatest ease, while avoiding cooling to such an extent as to form solid material accumulating in the apparatus and clogging it or the ducts leading therefrom.

A plant suitable for carrying out the present absorption process of producing sulfuric acid of predetermined strength, may for example consist of an elevated tank containing 100% sulfuric acid, from the bottom of which leads an outlet pipe to a tower through which the 100% acid is sprayed into an atmosphere of sulfuric anhydrid, finally falling into a receptacle which is water cooled, and provided with agitators, where the acid and $SO_3$ are mechanically agitated. In the bottom of this receptacle is a distributer, through which sulfuric anhydrid or gases containing it may be passed. In this receptacle the absorption of the $SO_3$ takes place and in order to render this as thorough as possible, several tanks, for example three in number, may be placed in series. The $SO_3$ enters the first tank, the spent gases pass out from the third tank, while fresh 100% sulfuric acid enters the latter tank and is withdrawn from the first tank. Acid of, say, 105% strength (100% $H_2SO_4 + 5\% SO_3$) is collected in a receiver and is withdrawn from the latter to a mixing tank, into which a sufficient amount of sulfuric acid of weaker strength, say ordinary 66° acid is run. This tank may also be fitted with an agitator and cooling coil. Dilution in this tank to, say 100% strength, is effected and such portion of the 100% acid as is required for use in charging the absorbing apparatus is pumped back to the elevated tank referred to above, to be used again, while the balance of the 100% acid is run into another tank to be diluted further to such strength of acid required or otherwise treated.

No drawings are filed in the present application as the foregoing description constitutes a sufficient disclosure without the aid of any drawings.

In using the terms 100% and 105% acid and the like I wish it understood that by 100% acid I refer to substantially the anhydrous acid corresponding quite closely to the formula $H_2SO_4$ and that while it may be anomalous to speak of a percentage of 105 as representing the content of sulfuric acid, it may be stated that such form of expression is not without usage in the trade and that in any event I use such expression to indicate that an acid of 100% which has absorbed an additional 5% or so of $SO_3$; hence throughout the specification where such terms are used they may be read in the light of the foregoing.

It should be understood that in the sulfuric acid industry there are recognized several forms or types of acid including 66° acid, 98% acid, 100% acid or anhydrous sulfuric acid, which of course is free from moisture, various dilute acids, in addition to the 66° and 98% acid mentioned and fuming acid or oleum which is commonly regarded as a solution of sulfur trioxid in anhydrous sulfuric acid but which chemically may be termed "a solution of pyro sulfuric acid in anhydrous sulfuric acid." Accordingly in the foregoing specification where various acid strengths are referred to, it should be understood that I have these terms in mind and do not for example mean that sulfuric acid can be made of more than 100% strength but that when sulfur trioxid is absorbed by sulfuric acid starting with anhydrous acid of 100% strength that pyro sulfuric is formed to the extent of the sulfur trioxid introduced, thus yielding oleum in various grades or strengths.

It should be understood that in carrying out my process involving inauguration of the absorption of the sulfur trioxid in anhydrous sulfuric acid I avoid all contact of the sulfur trioxid with moisture so that the process may be carried out throughout the gas absorbing stage without any contact by the sulfur trioxid with moisture, thereby affording me the particular advantages sought for under the present invention.

What I claim is:—

1. In the process of producing sulfuric acid of a given strength, the step which comprises passing sulfuric anhydrid into anhydrous sulfuric acid while mechanically agitating and cooling the product to a temperature at which absorption of sulfuric anhydrid takes place in an effective manner while avoiding cooling to such an extent as to form solid material.

2. In the process of producing sulfuric acid of a given strength, the step which comprises passing sulfuric anhydrid into initially 100% sulfuric acid while cooling the product.

3. In the process of producing sulfuric acid of a given strength, the step which comprises passing sulfuric anhydrid into initially water free sulfuric acid and in mechanically agitating and cooling the product.

4. In the process of producing sulfuric acid of a given strength, the step which comprises passing gases containing sulfuric anhydrid into initially anhydrous sulfuric acid of approximately 100% strength, in preventing contact of the gases with water-containing sulfuric acid during the period of absorption, and in mechanically agitating and cooling the product.

5. In the process of producing sulfuric acid of a given strength, the step which comprises passing sulfuric anhydrid into initially anhydrous sulfuric acid and in agitating and cooling the acid and in subsequently diluting the acid thereby produced with dilute sulfuric acid.

6. In the process of making sulfuric acid material of a given strength the step which comprises contacting sulfur trioxid solely with water-free sulfuric acid during the period of absorption.

7. In the process of making sulfuric acid of a given strength, the step which comprises passing sulfuric anhydrid into an anhydrous acid comprising sulfuric acid initially of 100% strength, whereby contact with water-containing sulfuric acid is avoided.

8. In the process of making sulfuric acid of a given strength, the step which comprises passing sulfuric anhydrid into sulfuric acid initially of slightly above 100% strength, in gradually raising the strength of such acid to a considerable extent and in subsequently diluting with a weaker acid to produce an acid of the required strength.

9. In the process of making sulfuric acid of a given strength, the step which comprises passing sulfuric anhydrid into an anhydrous acid comprising sulfuric acid of 100% strength, in gradually raising the strength of such acid, until at least about 5% of $SO_3$ has been taken up therein and in subsequently diluting with dilute sulfuric acid.

10. The process of preparing sulfuric acid of 98% strength which comprises passing sulfuric anhydrid into contact with an anhydrous acid comprising sulfuric acid of 100% strength, until approximately 5% of sulfuric anhydrid has been absorbed, in mixing the product with 66° sulfuric acid to produce an acid of approximately 100% strength, in separating the resulting acid mix into two portions, in diluting one portion with 66° acid to produce an acid of 98% strength and in passing sulfuric anhydrid into the remaining portion to produce an acid of approximately 105% strength and in continuing this cycle of operations.

11. The process of preparing sulfuric acid of a given strength which comprises passing sulfuric anhydrid into contact with an anhydrous acid comprising sulfuric acid of 100% strength, until approximately 5% of sulfuric anhydrid has been absorbed, in mixing the product with 66° sulfuric acid to produce an acid of approximately 100% strength, in separating the resulting acid mix into two portions, in diluting one portion with 66° acid to produce an acid of lesser strength and in passing sulfuric anhydrid into the remaining portion to produce an acid of approximately 105% strength.

12. The process of preparing sulfuric acid of a given strength which comprises passing sulfuric anhydrid into contact with sulfuric acid of at least 100% strength, until a considerable amount of sulfuric anhydrid has been absorbed, in diluting the product to produce an acid of approximately 100% strength, in separating the resulting acid mix into two portions and, in passing sulfuric anhydrid into one portion to produce stronger acid.

13. The process of preparing sulfuric acid of a given strength which comprises passing sulfuric anhydrid into contact with an anhydrous acid comprising sulfuric acid of 100% strength, until a substantial amount of sulfuric anhydrid has been absorbed, in mixing the product with sulfuric acid of less than 100% strength to produce an acid of approximately 100% strength, in separating the resulting acid mix into two portions, in separately collecting one portion, and in passing sulfuric anhydrid into the remaining portion.

HARRY M. WEBER.

Copies of this patent may be obtained for five cents each, by addressing the "Commissioner of Patents, Washington, D. C."